US009389241B2

(12) United States Patent
Kim et al.

(10) Patent No.: US 9,389,241 B2
(45) Date of Patent: Jul. 12, 2016

(54) ACCELERATION SENSOR

(71) Applicant: SAMSUNG ELECTRO-MECHANICS CO., LTD., Suwon (KR)

(72) Inventors: Jong Woon Kim, Suwon (KR); Jun Lim, Suwon (KR); Seung Mo Lim, Suwon (KR); Sang Jin Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 393 days.

(21) Appl. No.: 13/899,204

(22) Filed: May 21, 2013

(65) Prior Publication Data
US 2013/0319115 A1 Dec. 5, 2013

(30) Foreign Application Priority Data

May 31, 2012 (KR) .................. 10-2012-0058487

(51) Int. Cl.
| | |
|---|---|
| *G01C 19/00* | (2013.01) |
| *G01P 3/44* | (2006.01) |
| *G01C 19/56* | (2012.01) |
| *G01P 15/09* | (2006.01) |
| *G01P 15/12* | (2006.01) |
| G01P 15/08 | (2006.01) |

(52) U.S. Cl.
CPC . *G01P 3/44* (2013.01); *G01C 19/56* (2013.01); *G01P 15/09* (2013.01); *G01P 15/123* (2013.01); *G01C 19/00* (2013.01); *G01P 2015/084* (2013.01)

(58) Field of Classification Search
CPC ............. G01P 3/44; G01C 19/00; C23F 1/00; B29C 65/48
USPC ........................................ 73/504.12
See application file for complete search history.

(56) References Cited

U.S. PATENT DOCUMENTS

| | | | |
|---|---|---|---|
| 6,293,149 B1* | 9/2001 | Yoshida et al. ............. | 73/514.01 |
| 2002/0002864 A1* | 1/2002 | Kvisteroey et al. ......... | 73/504.12 |
| 2009/0158847 A1* | 6/2009 | Fujiyoshi et al. .......... | 73/504.12 |
| 2009/0282918 A1 | 11/2009 | Maekawa | |
| 2011/0182320 A1* | 7/2011 | Noda ......................... | G01J 5/02 374/121 |
| 2011/0265566 A1* | 11/2011 | Acar et al. .................. | 73/504.12 |
| 2011/0271760 A1* | 11/2011 | Ohkoshi et al. ............. | 73/504.12 |
| 2012/0297874 A1* | 11/2012 | Kim ........................ | G01C 19/56 73/504.12 |
| 2013/0036818 A1* | 2/2013 | Kim ................... | G01C 19/5755 73/504.02 |

* cited by examiner

Primary Examiner — Hezron E Williams
Assistant Examiner — Tarun Sinha
(74) Attorney, Agent, or Firm — NSIP Law

(57) ABSTRACT

Disclosed herein is a sensor. A sensor according to the present invention includes a mass body, a fixing part disposed so as to be spaced apart from the mass body, a first flexible part connecting the mass body with the fixing part in a Y-axis direction, a second flexible part connecting the mass body with the fixing part in an X-axis direction, and a membrane disposed over the second flexible part and having a width in a Y-axis direction larger than a width in a Y-axis direction of the second flexible part. Here, a width of an X-axis direction of the first flexible part is larger than a thickness in a Z-axis direction thereof and a thickness in a Z-axis direction of the second flexible part is larger than a width in a Y-axis direction thereof.

7 Claims, 6 Drawing Sheets

ACCELERATION SENSOR

CROSS REFERENCE TO RELATED APPLICATION

This application claims the benefit of Korean Patent Application No. 10-2012-0058487, filed on May 31, 2012, entitled "Sensor," which is hereby incorporated by reference in its entirety into this application.

BACKGROUND OF THE INVENTION

1. Technical Field

The present invention relates to a sensor.

2. Description of the Related Art

Recently, a sensor has been used in various fields, for example, the military, such as an artificial satellite, a missile, an unmanned aircraft, or the like, vehicles, such as an air bag, electronic stability control (ESC), a black box for a vehicle, or the like, hand shaking prevention of a camcorder, motion sensing of a mobile phone or a game machine, navigation, or the like.

The sensor generally adopts a configuration in which a mass body is bonded to a flexible substrate such as a membrane, or the like, so as to measure acceleration, angular velocity, and force. By the above configuration, the sensor calculates acceleration by measuring inertial force applied to the mass body, calculates angular velocity by measuring Coriolis force applied to the mass body, or calculates force by measuring external force directly applied to the mass body.

In detail, a method of measuring the acceleration and the angular velocity by using the sensor will be described in detail below. First, the acceleration may be obtained by Newton's law of motion "F=ma", where "F" represents the inertial force applied to the mass body, "m" represents the mass m of the mass body, and "a" represents the acceleration to be measured. Among others, the acceleration a can be obtained by sensing the inertial force F applied to the mass body and dividing the sensed inertial force F by the mass of the mass body that is a predetermined value. In addition, the angular velocity may be obtained by Coriolis force "F=2 mΩ·v", where "F" represents the Coriolis force applied to the mass body, "m" represents the mass of the mass body, "Ω" represents the angular velocity to be measured, and "v" represents the motion velocity of the mass body. Among others, since the motion velocity v of the mass body and the mass m of the mass body are values that are known in advance, the angular velocity Ω may be obtained by sensing the Coriolis force F applied to the mass body.

Meanwhile, the sensor according to the prior art is provided with beams extending in an X-axis direction and a Y-axis direction so as to drive the mass body or sense a displacement of the mass body, as disclosed in Patent Document of the following Prior Art Document. However, in the sensor according to the prior art, the beam extending in the X-axis direction basically has the same rigidity as the beam extending in the Y-axis direction, such that crosstalk may occur at the time of measuring acceleration or interference of a resonance mode may occur at the time of measuring angular velocity. Due to the crosstalk or the interference of the resonance mode, the sensor according to the related art detects force that is applied in an unwanted direction, thereby degrading sensitivity.

PRIOR ART DOCUMENT

Patent Document (Patent Document 1) US20090282918 A1

In order to solve the above problems, a method for controlling a width of one of the beams extending in the X-axis direction and the Y-axis direction can be considered so that the beams extending in the X-axis direction and the Y-axis direction are different rigidity. However, when the width of one beam is reduced smaller than the width of another beam, it is difficult to secure an area through which a wiring passes. Even though the wiring passes through the beam having a relatively large width, an area of an electrode (charges are generated in a piezoelectric material according to a motion of the beam) is reduced and therefore, output charges may be lost.

SUMMARY OF THE INVENTION

The present invention has been made in an effort to provide a sensor capable of securing an area through which a wiring passes by including a separate membrane in addition to a flexible part while including a structure in which crosstalk or interference of a resonance mode is removed.

According to a preferred embodiment of the present invention, there is provided a sensor, including: a mass body; a fixing part disposed so as to be spaced from the mass body; a first flexible part connecting the mass body with the fixing part in an Y-axis direction; a second flexible part connecting the mass body with the fixing part in an X-axis direction; and a membrane disposed over the second flexible part and having a width in a Y-axis direction larger than a width in a Y-axis direction of the second flexible part so as to connect the mass body with the fixing part; wherein a width in the X-axis direction of the first flexible part is larger than a thickness in a Z-axis direction thereof, and the second flexible part has a thickness in a Z-axis direction larger than the width in the Y-axis direction.

The sensor may further include: a wiring passing through the membrane.

The sensor may further include: a sensing unit disposed in the first flexible part to sense a displacement of the mass body.

The sensing unit may include: a piezoelectric material or a piezo-resistor; and an electrode formed in the piezoelectric material or the piezo-resistor.

The sensor may further include: a wiring extending to the fixing part from the electrode through the membrane.

The electrode may include: a first electrode; and a second electrode formed to be closer to the mass body than the first electrode, and the sensor may further include: a first wiring extending to the fixing part from the first electrode; and a second wiring extending to the fixing part from the second electrode through the membrane.

When being viewed from an XY plane, the wiring may be formed so as not to overlap the second flexible part.

A portion at which the membrane may be connected to the mass body or the fixing part is subjected to rounding processing.

The mass body may rotate based on an X axis.

A bending stress may be generated at the first flexible part and a torsion stress may be generated at the second flexible part.

The second flexible part may be disposed over a center of gravity of the mass body based on the Z-axis direction.

The second flexible part may be disposed at a position corresponding to a center of gravity of the mass body based on the X-axis direction.

The second flexible part may connect both sides of the mass body and the fixing part to each other.

The second flexible part may connect one side of the mass body and the fixing part to each other.

The first flexible part may connect both sides of the mass body and the fixing part to each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
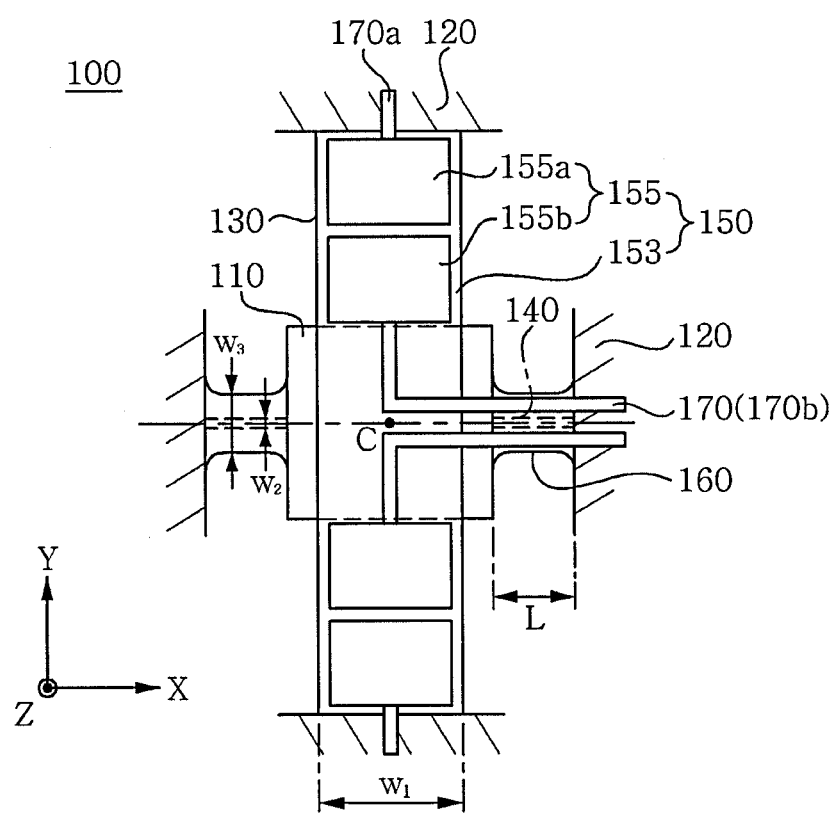
FIG. 1 is a plan view of a sensor according to a first preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
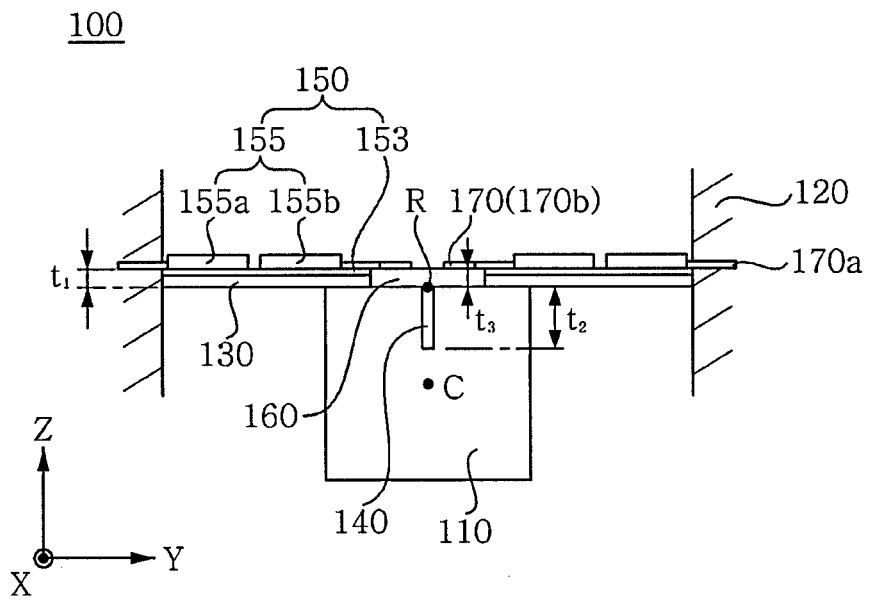
FIG. 2 is a side view of the sensor shown in FIG. 1.
Figure 3:
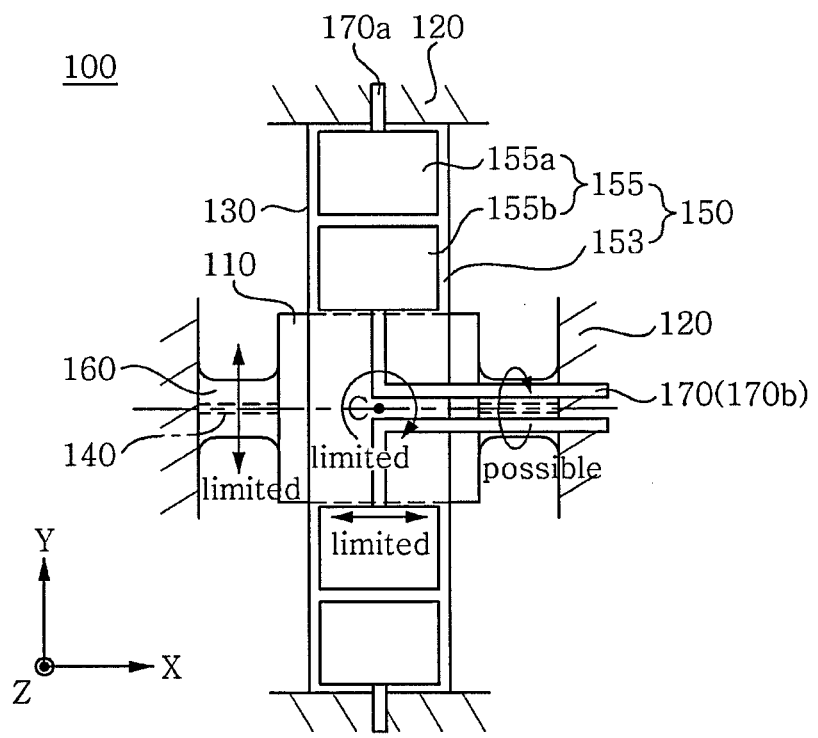
FIG. 3 is a plan view showing a movable direction of a mass body shown in FIG. 1.
Figure 4:
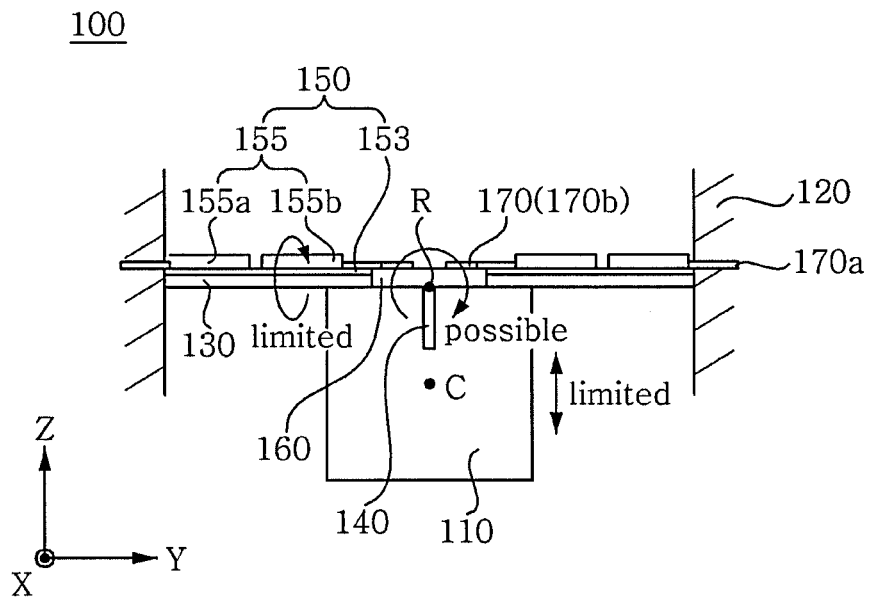
FIG. 4 is a side view showing a movable direction of a mass body shown in FIG. 2.

FIG. 1 is a plan view of a sensor according to a first preferred embodiment of the present invention, FIG. 2 is a side view of the sensor shown in FIG. 1, FIG. 3 is a plan view showing a movable direction of a mass body shown in FIG. 1, and FIG. 4 is a side view showing a movable direction of a mass body shown in FIG. 2.

As shown in FIGS. 1 and 2, a sensor 100 according to a preferred embodiment of the present invention is configured to include a mass body 110, a fixing part 120 disposed so as to be spaced apart from the mass body 110, a first flexible part 130 connecting the mass body 110 with the fixing part 120 in a Y-axis direction, a second flexible part 140 connecting the mass body 110 with the fixing part 120 in an X-axis direction, and a membrane 160 disposed over the second flexible part 140 and having a width $w_3$ in a Y-axis direction larger than a width $w_2$ in a Y-axis direction of the second flexible part 140 so as to connect the mass body 110 with the fixing part 120. In this configuration, a width $w_1$ of an X-axis direction of the first flexible part 130 is larger than a thickness $t_1$ in a Z-axis direction thereof and a thickness $t_2$ in a Z-axis direction of the second flexible part 140 is larger than a width $w_2$ in a Y-axis direction thereof.

The mass body 110 is displaced by inertial force, Coriolis force, external force, and the like and is connected with the fixing part 120 through the first flexible part 130 and the second flexible part 140. Here, the mass body 110 is displaced based on the fixing part 120 by bending of the first flexible part 130 and torsion of the second flexible part 140 when force is applied thereto. In this case, the mass body 110 rotates based on the X axis and the detailed contents thereof will be described below. Meanwhile, the preferred embodiment of the present invention shows the mass body 110 having a squared pillar shape, but is not limited thereto. Therefore, the mass body 110 may be formed in all the shapes known to those skilled in the art such as a cylindrical shape, a fan shape, and the like.

The fixing part 120 supports the first flexible part 130 and the second flexible part 140 to secure a space in which the mass body 110 may be displaced and serves as a reference when the mass body 110 is displaced. Here, the fixing part 120 is formed to enclose the mass body 110 and a center thereof is provided with the mass body 110.

The first and second flexible parts 130 and 140 serve to connect the fixing part 120 with the mass body 110 so that the mass body 110 may be displaced based on the fixing part 120, wherein the first flexible part 130 and the second flexible part 140 are formed so as to be vertical to each other. That is, the first flexible part 130 connects the mass body 110 with the fixing part 120 in the Y-axis direction and the second flexible part 140 connects the mass body 110 with the fixing part 120 in the X-axis direction. In this case, the first flexible part 130 and the second flexible part 140 each connect both sides of the mass body 110 and the fixing part 120 to each other. Further, a width $w_1$ in a Y-axis direction of the first flexible part 130 is larger than a thickness $t_1$ in a Z-axis direction thereof and a thickness $t_2$ in a Z-axis direction of the second flexible part 140 is larger than a width $w_2$ in a Y-axis direction thereof.

As described above, the thickness $t_2$ in the Z-axis direction of the second flexible part 140 is larger than the width $w_2$ of the Y-axis direction thereof and therefore, as shown in FIG. 4, the mass body 110 limits rotation based on the Y axis or translation in the Z-axis direction but may relatively freely rotate based on the X axis.

In detail, as rigidity when the second flexible part 140 rotates based on the Y axis is larger than rigidity when the second flexible part 140 rotates based on the X axis, the mass body 110 may freely rotate based on the X axis but limits the rotation based on the Y axis. Similarly thereto, as rigidity when the second flexible part 140 is translated in the Z-axis direction is larger than rigidity when the second flexible part 140 rotates based on the X axis, the mass body 110 may freely rotate based on the X axis but limits the translation based on the Z-axis direction. Therefore, as a value of the second flexible part 140 (the rigidity when rotating based on the Y axis or the rigidity when being translated in the Z-axis direction)/(the rigidity when rotating based on the X axis) is increased, the mass body 110 freely rotates based on the X axis, but limits the rotation based on the Y axis or the translation in the Z-axis direction.

Referring to FIGS. 1 and 2, the relationship between the thickness $t_2$ in the Z-axis direction of the second flexible part 140, a length L in the X-axis direction, the width $w_2$ in the Y-axis direction, and the rigidity for each direction is as follows.

(1) The rigidity when the second flexible part 140 rotates based on the Y axis or the rigidity when the second flexible part 140 is translated in the Z-axis direction becomes $$\propto w_2 \times t_2^3 / L^3$$

(2) The rigidity when the second flexible part 140 rotates based on the X axis becomes $$\propto w_2^3 \times t_2 / L$$

According to the above two Equations, the value of the second flexible part 140 (the rigidity when rotating based on the Y axis or the rigidity when being translated in the Z-axis direction)/(the rigidity when rotating based on the X axis) is in proportion to $(t_2/(w_2 L))^2$. However, according to the present embodiment, the thickness $t_2$ in the Z-axis direction of the second flexible part 140 is larger than the width $w_2$ in the Y-axis direction and therefore, $(t_2/(w_2 L))^2$ is large and the value of the second flexible part 140 (the rigidity when rotating based on the Y axis or the rigidity when being translated in the Z-axis direction)/(the rigidity when rotating based on the X axis) is increased accordingly. Due to the characteristics of the second flexible part 140, the mass body 110 freely rotates based on the X axis, but limits the rotation based on the Y axis or the translation in the Z-axis direction (see FIG. 4).

Meanwhile, the first flexible part 130 may limit the rotation of the mass body 110 based on the Z axis or the translation thereof in the Y-axis direction since the longitudinal (the Y-axis direction) rigidity is relatively very high (see FIG. 3). In addition, the second flexible part 140 may limit the translation of the mass body 110 in the X-axis direction since the longitudinal (the X-axis direction) rigidity is relatively very high (see FIG. 3).

Consequently, due to the characteristics of the first flexible part 130 and the second flexible part 140 as described above, the mass body 110 may rotate based on the X axis but limits the rotation based on the Y axis or the Z axis or the translation in the Z-axis, Y-axis, or X-axis direction. That is, the movable direction of the mass body 110 is as the following Table 1.

TABLE 1

| Motion Direction of Mass Body | Acceptable or Not |
| --- | --- |
| Rotation Based On X Axis | Acceptable |
| Rotation Based On Y Axis | Limit |
| Rotation Based On Z Axis | Limit |
| Translation In X-Axis Direction | Limit |
| Translation In Y-Axis Direction | Limit |
| Translation In Z-Axis Direction | Limit |

As described above, the mass body 110 may rotate based on the X axis but the motion thereof in the rest directions is limited, such that the mass body 110 may be displaced (the rotation based on the X axis) only by the force in the desired direction. Consequently, the sensor 100 according to the preferred embodiment of the present invention may prevent crosstalk from occurring at the time of measuring acceleration or force and remove the interference of the resonance mode at the time of measuring angular velocity.

Figure 5A:
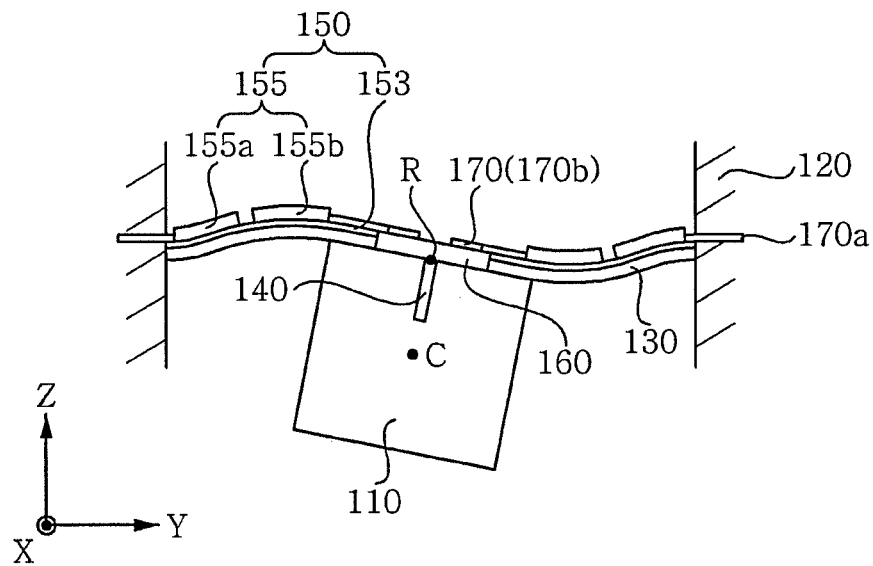
FIGS. 5A and 5B are side views showing a process of rotating the mass body shown in FIG. 2 based on an X axis.
Figure 5B:
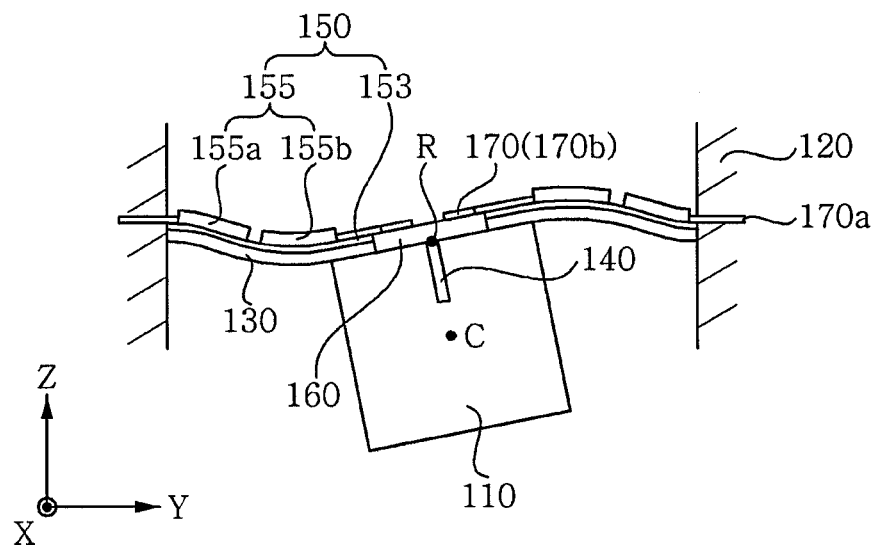

Meanwhile, FIGS. 5A and 5B are side views showing a process of rotating the mass body shown in FIG. 2 based on the X axis. As shown in FIGS. 5A and 5B, the mass body 110 rotates a rotating axis R based on the X axis and therefore, a bending stress that is a combination of a compression stress and a tension stress is generated in the first flexible part 130 and a torsion stress is generated in the second flexible part 140 based on an X axis. In this case, in order to generate a torque in the mass body 110, the second flexible part 140 may be provided at a higher position than the center of gravity C of the mass body 110 based on the Z-axis direction. In addition, as shown in FIG. 1, the second flexible part 140 may be provided at a position corresponding to the center of gravity C of the mass body 110 based on the X-axis direction so that the mass body 110 accurately rotates based on the X axis.

Figure 6:
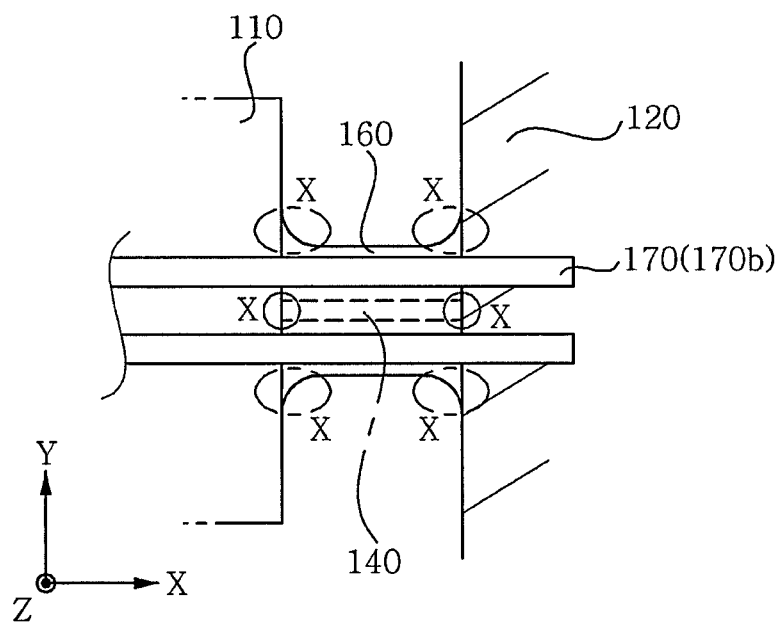
FIG. 6 is an enlarged view of a second flexible part shown in FIG. 1.

The membrane 160 is disposed over the second flexible part 140 so as to connect the mass body 110 with the fixing part 120. Here, the width $w_3$ in the Y-axis direction of the membrane 160 is larger than the width $w_2$ in the Y-axis direction of the second flexible part 140, thereby providing the area through which the wiring 170 may pass. However, when the thickness $t_3$ in the Z-axis direction of the membrane 160 is too thick, the mass body 110 may affect the structural characteristics that may rotate based on only the X axis. Therefore, it is preferable that the thickness $t_3$ in the Z-axis direction of the membrane 160 is smaller than the width $w_3$ in the Y-axis direction. That is, the membrane 160 may be formed in a plate shape, and when being viewed from a cross section as shown in FIG. 2, may be formed in a "T"-letter shape by vertically meeting the second flexible part 140. FIG. 6 is an enlarged view of the second flexible part shown in FIG. 1. As shown in FIG. 6, when the mass body 110 rotates based on the X axis, there is a need to prevent the wiring 170 from passing through a stress concentration part X that may generate charges. Here, the stress concentration part X is a portion at which the second flexible part 140 meets the mass body 110 or the second flexible part 140 meets the fixing part 120. Therefore, when being viewed from an XY plane, the wiring 170 may be formed so as not to overlap the second flexible part 140. Another stress concentration part X is a portion at which the membrane 160 meets the mass body 110 or the membrane 160 meets the fixing part 120. Therefore, the portion at which the membrane 160 is connected to the mass body 110 or the fixing part 120 may be subjected to rounding processing so that the wiring 170 does not pass through a portion at which the membrane 160 is connected to the mass body 110 or the membrane 160 is connected to the fixing part 120.

Meanwhile, as shown in FIGS. 1 and 2, the wiring 170 passing through the membrane 160 extends to the fixing part 120 from the sensing unit 150. Basically, the sensing unit 150 measures the bending of the first flexible part 130 and the torsion of the second flexible part 140 to sense the displacement of the mass body 110 rotating based on the X axis. However, when being viewed based on an XY plane (see FIG. 1), the first flexible part 130 is relatively wide but the second flexible part 140 is relatively narrow, such that the first flexible part 130 may be provided with the sensing unit 150 sensing the displacement of the mass body 110. In this case, the sensing unit 150 measures the bending of the first flexible part 130 to sense the displacement of the mass body 110 rotating based on the X axis. Meanwhile, the sensing unit 150 may include a piezoelectric material 153 and an electrode 155 formed in the piezoelectric material 153. Here, the electrode 155 measures charges generated from the piezoelectric material 153 and is electrically connected to a control unit through the wiring 170 extending to the fixing part 120. In this case, as described above, the wiring 170 extends to the fixing part 120 through the membrane 160 from the electrode 155. Meanwhile, the electrode 155 and the wiring 170 may be formed in various shapes. For example, the electrode 155 may include a first electrode 155a closed to the fixing part 120 in the first flexible part 130 and a second electrode 155b closer to the mass body 110 than the first electrode 155a. In connection with this, the wiring 170 may include a first wiring 170a that directly extends to the fixing part 120 from the first electrode 155a and a second wiring 170b that extends to the fixing part 120 passing through the membrane 160 from the second electrode 155b. As described above, in order to extend the second wiring 170b to the fixing part 120 by forming the electrode 155 and the wiring 170, there is no need to reduce an area of the first electrode 155a and thus, output charges are not lost. In addition, the second wiring 170b passes through the membrane 160 and therefore, there is no need to increase the width $w_2$ in the Y-axis direction of the second flexible part 140 so as to pass through the second wiring 170b. Therefore, as the width $w_2$ in the Y-axis direction of the second flexible part 140 is increased, the rigidity of the second flexible part 140 is increased to prevent sensitivity and a decoupling effect from being degraded.

Meanwhile, the preferred embodiment of the present invention describes the sensing unit 150 in a piezoelectric type, but is not limited thereto. Therefore, the sensing unit 150 may use a piezoresistive type. That is, the sensing unit 150 may include a piezo-resistor 153 and the electrode 155 formed in the piezo-resistor 153.

Figure 7:
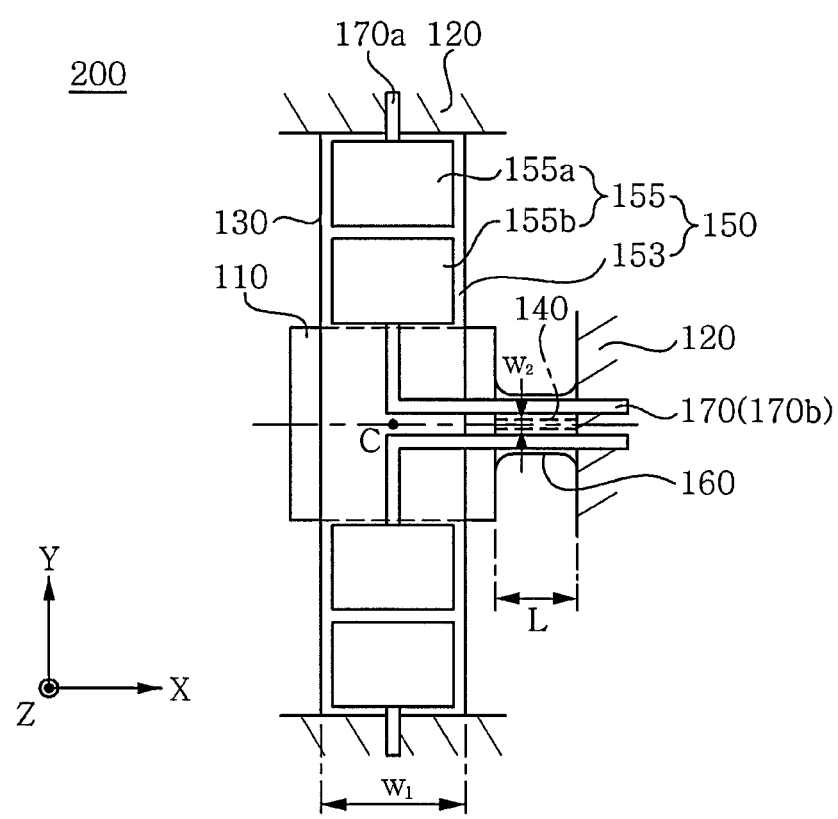
FIG. 7 is a plan view of a sensor according to a second preferred embodiment of the present invention.
Figure 8:
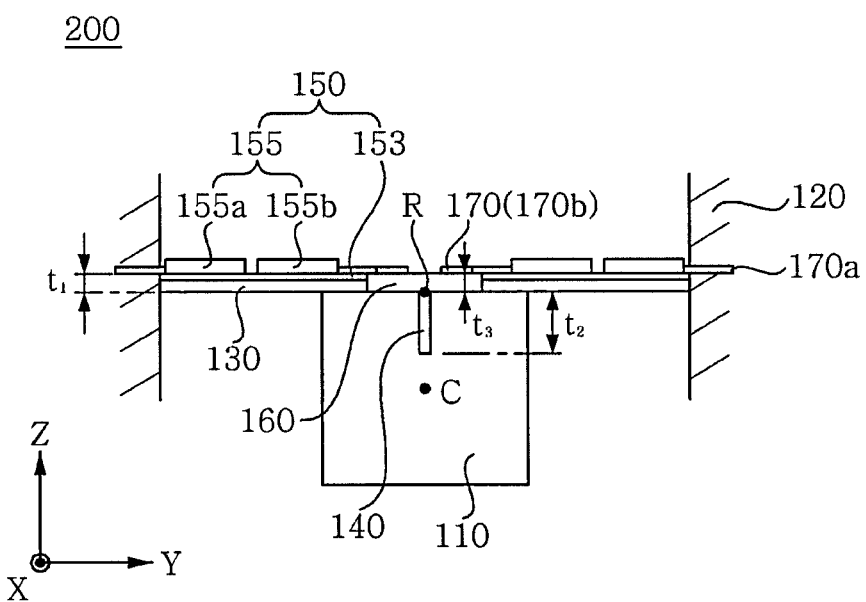
FIG. 8 is a side view of the sensor shown in FIG. 7.

FIG. 7 is a plan view of a sensor according to a second preferred embodiment of the present invention and FIG. 8 is a side view of the sensor shown in FIG. 7.

As shown in FIGS. 7 and 8, when a sensor 200 according to a preferred embodiment of the present invention compares with the sensor 100 according to the foregoing first preferred embodiment, the sensor has the same configuration in that the second flexible part 140 and the membrane 160 are different from each other. Therefore, in the sensor 200 according to the preferred embodiment of the present invention, the second flexible part 140 and the membrane 160 may be mainly described.

The second flexible part 140 of the sensor 100 according to the first preferred embodiment of the present invention connects both sides of the mass body 110 and the fixing part 120 to each other, but the second flexible part 140 of the sensor 200 according to the preferred embodiment of the present invention connects only one side of the mass body 110 and the fixing part 120 to each other (see FIG. 7). However, similarly to the sensor 100 according to the first embodiment of the present invention, in the sensor 200 according to the preferred embodiment of the present invention, the width $w_1$ in the X-axis direction of the first flexible part 130 is larger than the thickness $t_1$ in the Z-axis direction thereof and the thickness $t_2$ in the Z-axis direction of the second flexible part 140 is larger than the width $w_2$ in the Y-axis direction thereof.

As described above, the width $w_2$ in the Z-axis direction of the second flexible part 140 is larger than the thickness $t_2$ of the Y-axis direction thereof and therefore, the mass body 110 relatively freely rotates based on the X axis, but limits the rotation based on the Y axis or the translation in the Z-axis direction.

In addition, the first flexible part 130 may limit the rotation of the mass body 110 based on the Z axis or the translation thereof in the Y-axis direction since the longitudinal (Y-axis direction) rigidity is relatively very high. In addition, the second flexible part 140 may limit the translation of the mass body 110 in the X-axis direction since the longitudinal (the X-axis direction) rigidity is relatively very high (see FIG. 3).

Consequently, due to the characteristics of the first flexible part 130 and the second flexible part 140 as described above, the mass body 110 may rotate based on the X axis but limits the to rotation based on the Y axis or the Z axis or the translation in the Z-axis, Y-axis, or X-axis direction. Therefore, the sensor 200 according to the preferred embodiment of the present invention may displace the mass body 110 only by the force of the desired direction (rotation based an X axis). Consequently, the sensor 200 according to the preferred embodiment of the present invention may prevent crosstalk from occurring at the time of measuring acceleration or force and remove the interference of the resonance mode at the time of measuring angular velocity.

In addition, in the sensor 200 according to the preferred embodiment of the present invention, the second flexible part 140 connects one side of the mass body 110 and the fixing part 120 to each other and therefore, the membrane 160 disposed over the second flexible part 140 may also connect one side of the mass body 110 and the fixing part 120 to each other (see FIG. 7). However, similarly to the sensor 100 according to the first preferred embodiment of the present invention, in the sensor 200 according to the preferred embodiment of the present invention, the wiring 170 extends to the fixing part 120 from the sensing unit 150 by passing through the membrane 160. Therefore, in order to extend the second wiring 170b to the fixing part 120, there is no need to reduce the area of the first electrode 155a and thus, the output charges are not lost. In addition, the second wiring 170b passes through the membrane 160 and therefore, there is no need to increase the width $w_2$ in the Y-axis direction of the second flexible part 140 so as to pass through the second wiring 170b. Therefore, as the width $w_2$ in the Y-axis direction of the second flexible part 140 is increased, the rigidity of the second flexible part 140 is increased to prevent sensitivity and a decoupling effect from being degraded.

Meanwhile, the sensors 100 and 200 according to the preferred embodiment of the present invention are not particularly limited thereto and therefore, may be applied to an acceleration sensor, an angular velocity sensor, a force sensor, and the like.

According to the preferred embodiments of the present invention, it is possible to secure the area through which the wiring passes by including the separate membrane in addition to the flexible part while including the structure in which the crosstalk or the interference of the resonance mode can be removed.

In addition, according to the preferred embodiment of the present invention, the separate membrane in addition to the flexible part is provided and as a result, the area of the electrode needs to be reduced in order to pass through the wiring and the output charges are not to be lost accordingly.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention. In particular, the present invention describes based on the "X axis", "Y axis", and "Z axis", which is defined for convenience of explanation and therefore, the scope of the present invention is not limited thereto.

Accordingly, any and all modifications, variations or equivalent arrangements should be considered to be within the scope of the invention, and the detailed scope of the invention will be disclosed by the accompanying claims.

What is claimed is:
1. An acceleration sensor, comprising:
a mass body;
a fixing part disposed so as to be spaced from the mass body;
a first flexible part connecting both sides of the mass body with the fixing part to each other in an Y-axis direction;

a second flexible part connecting one side or both sides of the mass body with the fixing part to each other in an X-axis direction;

a membrane disposed over the second flexible part and having a width in a Y-axis direction larger than a width in a Y-axis direction of the second flexible part so as to connect the mass body with the fixing part; and a wiring passing through the membrane;

wherein a width in the X-axis direction of the first flexible part is larger than a thickness in a Z-axis direction thereof, wherein the second flexible part has a thickness in a Z-axis direction larger than the width in the Y-axis direction, wherein the mass body rotates based on an X-axis, wherein a bending stress is generated at the first flexible part and a torsion stress is generated at the second flexible part, wherein the second flexible part is disposed over a center of gravity of the mass body based on the Z-axis direction, wherein the second flexible part is disposed at a position corresponding to a center of gravity of the mass body based on the X-axis direction, and wherein the membrane is configured to prevent the wiring from overlapping a stress concentration area located where the membrane is disposed over the second flexible part.

2. The sensor as set forth in claim 1, further comprising: a sensing unit disposed in the first flexible part to sense a displacement of the mass body.

3. The sensor as set forth in claim 2, wherein the sensing unit includes:
   a piezoelectric material or a piezo-resistor; and
   an electrode formed in the piezoelectric material or the piezo-resistor.

4. The sensor as set forth in claim 3, further comprising:
   a wiring extending to the fixing part from the electrode through the membrane.

5. The sensor as set forth in claim 3, wherein the electrode includes:
   a first electrode; and
   a second electrode formed to be closer to the mass body than the first electrode, and
   wherein the sensor further comprising:
   a first wiring extending to the fixing part from the first electrode; and
   a second wiring extending to the fixing part from the second electrode through the membrane.

6. The sensor as set forth in claim 1, wherein when being viewed from an XY plane, the wiring is formed so as not to overlap the second flexible part.

7. The sensor as set forth in claim 1, wherein a portion at which the membrane is connected to the mass body or the fixing part is subjected to rounding processing.

* * * * *